3,649,365
METHOD OF FORMING A CATALYST, CATALYST COATED POWDER AND ELECTRODE
John Paynter, Burnt Hills, and John R. Morgan, Schenectady, N.Y., assignors to General Electric Company
Filed May 29, 1968, Ser. No. 733,032
Int. Cl. H01m 13/04
U.S. Cl. 136—120 FC 3 Claims

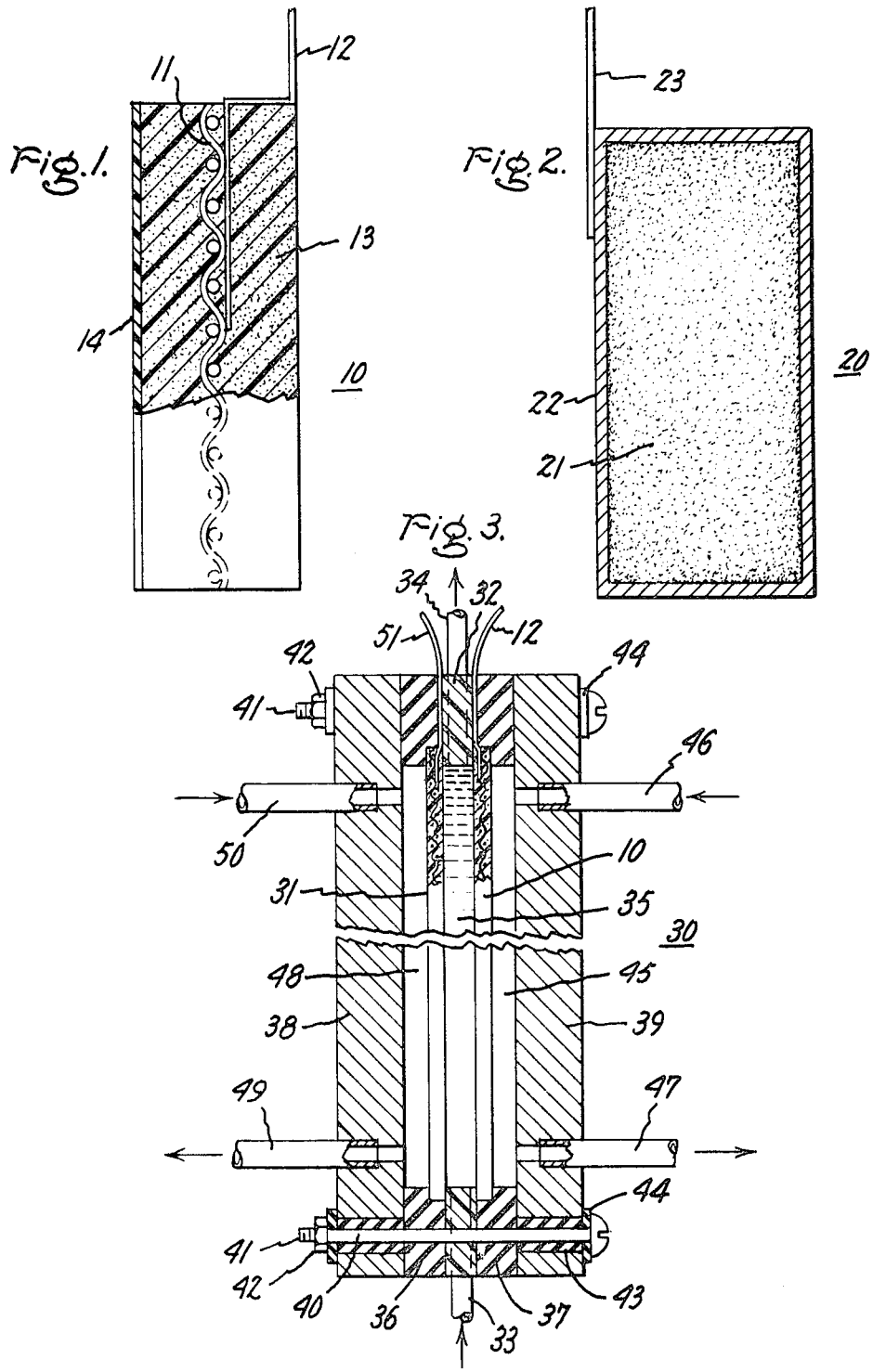

ABSTRACT OF THE DISCLOSURE

Methods are described for forming high surface area catalysts by thermal decomposition of a mixture of one thermally decomposable silver salt and one thermally decomposable nickel salt. Electrodes can be made from these catalysts. Methods are also described for forming high surface area catalysts, supported catalysts and electrodes by mixing metallic salts of silver acetate and nickel acetate with an organic solvent or an organic solvent and aqueous solvent to form a solution. The solution is evaporated and the mixed salts are decomposed thermally to produce a high surface area catalyst from which electrodes can be formed.

Additionally, the solution can be applied to finely divided powder or to at least a portion of a porous substrate after which the solvent is evaporated. After thermal decomposition of the mixed metallic salts, there are formed supported catalysts and electrodes, respectively. The resulting high surface area catalysts, supported catalysts and electrodes are considerably less expensive than platinum catalysts.

---

In a copending patent application of Willard T. Grubb, Ser. No. 733,171, filed concurrently herewith, there is disclosed and claimed methods for forming supported catalysts and electrodes by thermal decomposition on a substrate of at least one organic soluble silver salt after evaporation of its non-aqueous solvent. This copending application is assigned to the same assignee as the present application.

This invention relates to methods of forming high surface area catalysts, supported catalysts and electrodes and, more particularly, to such methods of forming high surface area catalysts and electrodes by thermal decomposition of a mixture of one thermally decomposable silver salt and one thermally decomposable nickel salt, and of forming catalysts, supported catalysts and electrodes by thermal decomposition of mixed salts of silver acetate and nickel acetate after evaporation of the solvent in which the salts are mixed initially.

Noble metal catalysts, such as platinum, have been applied to a support material by applying an aqueous solution of an appropriate acid to the support material, drying and reducing the dried material in flowing hydrogen at an elevated temperature. U.S. Pat. 3,242,011 describes applying similarly to a porous nickel plaque a solution of silver acetate dissolved in ammonia, or of nickel formate dissolved in ammonia, or by applying mixed silver and nickel solutions to the plaques. The treated plaque is then heated at a temperature below about 300° C. in the presence of a reducing agent for a sufficient time to form the catalyst. Alternately, a reducing agent is dissolved in the ammonia prior to applying the solution to the plaque, and the treated plaque is then heat treated.

Both of the above methods employ an aqueous solution and require a reducing agent, such as hydrogen, during the elevated temperature reduction of the catalytic material. When a mixture of silver acetate and nickel formate was dissolved in an aqueous solvent of ammonia to provide a solution as described in the above patent, and the solvent was evaporated from the solution, the nickel formate appeared to act as a reducing agent causing the silver to precipitate before the solvent was evaporated. The resulting material was heated at a temperature below about 300° C. to decompose thermally the mixture to form a catalyst as described above; however, without employing a reducing agent as recited in the subject patent, there resulted a dried material. Visual examination shows the bottom portion of the material to be brownish in color and the upper portion to be a layer thereon of apparently continuous silver. Thus, the resulting material did not appear to be a high surface area powder.

Our invention is directed to an improved method of forming high surface area catalysts by thermal decomposition of a mixture of one thermally decomposable silver salt and one thermally decomposable nickel salt, and of forming electrodes from these catalysts. Our invention is directed further to an improved method of forming catalysts, supported catalysts and electrodes by thermal decomposition of mixed salts of silver acetate and nickel acetate after evaporation of the solvent in which the salts are mixed initially. Such high surface area catalysts and supported catalysts can be used to form electrodes by binding the powder particles together with a suitable binder. The above electrodes are useful in various types of electrochemical cells, such as fuel cells and metal-air cells. While the catalysts, supported catalysts and coated porous substrates of our invention can be formed into a number of different types of electrode structures, each electrode should be one which is electronically conductive, adsorbs the fuel or oxidant employed, will present catalyst materials for the electrode reaction, and will remain invariant under the operating conditions of the cell.

It is a primary object of our invention to provide a new and improved method of preparing an inexpensive, high surface area catalyst.

It is another object of our invention to provide new and improved electrodes employing such a catalyst.

It is a further object of our invention to provide such an improved electrode which is useful as an oxygen or air cathode or as a hydrazine anode in an alkaline electrochemical cell.

In accordance with one aspect of our invention, a high surface area catalyst is formed by thermal decomposition of a mixture of one thermally decomposable silver salt and one thermally decomposable nickel salt. Additionally, mixed metallic salts of silver acetate and nickel acetate can be decomposed, or decomposed on a substrate after evaporation of a solution of an organic solvent, or a solution of an organic solvent and an aqueous solvent in which the salts are mixed initially.

These and various other objects, features and advantages of the invention will be better understood from the following description taken in connection with the accompanying drawing in which:

FIG. 1 is a sectional view of an electrode made from finely divided powder in accordance with our invention;

FIG. 2 is a sectional view of an electrode made from a porous substrate in accordance with our invention; and FIG. 3 is a sectional view of a fuel cell employing an electrode of FIG. 1 as its cathode electrode.

In FIG. 1 of the drawing, there is shown generally an electrode 10 embodying our invention which has a terminal grid in the form of a metal wire screen 11 which serves the functions of transmitting electrical current and providing reinforcement for the electrode. An electrical connection in the form of an electrical lead 12 is connected directly to screen 11. Electrode 10 has a gas adsorbing supported catalyst 13 comprising a catalyst coated on finely divided powder material, such as carbon which is held together by a binder and in electronically conductive relation with wire screen 11. The supported catalyst is formed by the thermal decomposition on a finely divided powder of mixed metallic salts of silver acetate and nickel acetate after evaporation of a solution of pyridine and water. The supported catalyst is held together, for example, and bonded to screen 11 by a binder material of an aqueous suspension of polytetrafluoroethylene (PTFE). Supported catalyst 13 and binder surrounds both the screen 11 and a portion of electrical lead 12. The ratio of such a binder to the supported catalyst may be from about 5 to 50% by weight, with the preferred range being from about 10 to 30% by weight. If desired, a hydrophobic film 14 is shown bonded to one surface of supported catalyst 13 and binder to prevent electrolyte drowning of electrode 10. This film is desirable if the electrode is to be used with a free aqueous electrolyte.

In FIG. 2 of the drawing, there is shown generally an electrode 20 embodying our invention which has a porous substrate material 21, such as carbon, with a catalyst 22 of our invention impregnated into and coating substrate 21. An electrical lead 23 is affixed to electrode 21 in any suitable manner.

We discovered unexpectedly that we could prepare a stable, high surface area catalyst by mixing together a thermally decomposable silver salt and a thermally decomposable nickel salt, and decomposing thermally the mixed salts. We found further than an electrode can be made from such a catalyst. Such an electrode is suitable for use as an oxygen or an air cathode or as a hydrazine anode in an alkaline electrochemical cell.

A wide variety of thermally decomposable silver salts and thermally decomposable nickel salts are employable in the method of our invention. Suitable silver salts include silver acetate, silver carbonate and silver nitrate. Suitable nickel salts include nickel acetate, nickel carbonate, nickel nitrate, and nickel formate.

We found further that a high area catalyst material can be prepared by forming a solution from a mixture of silver acetate, nickel acetate, and a solvent selected from the group consisting of organic solvents and mixtures thereof with aqueous solvents. The solvent is evaporated from the solution, and the mixed metallic salts are decomposed to form a high surface area catalyst material which can be formed subsequently into an electrode.

We found also that the above solution can be applied to finely divided powder to form a supported catalyst or to at least a portion of a porous substrate to form an electrode. The supported catalyst can also be formed into an electrode. Such electrodes are suitable for use as oxygen or air cathodes when used with an aqueous alkaline electrolyte or are suitable as anodes when used with an aqueous electrolyte and a hydrazine fuel.

Various organic and aqueous solvents are suitable for our method of preparing a high surface area catalyst, a supported catalyst, or an electrode. However, we prefer to employ pyridine as the organic solvent, which can be utilized alone for forming lower weight percentages of the catalyst. We prefer to employ pyridine and water when higher weight percentages of the catalyst are prepared.

We found further that various finely divided powders, which are electronically conductive, can be employed to form the substrate for the supported catalyst of our invention. These powders include finely divided powders of carbon, carbon with boron dissolved therein, and mixtures of carbon with boron dissolved therein and boron carbide.

We found further that we could prepare directly a supported catalyst in the form of an electrode wherein a porous substrate has the mixed metallic salts thermally decomposed thereon. While various porous substrate materials are useable in our process, we prefer to employ a porous carbon substrate or a porous nickel substrate.

In FIG. 3 of the drawing, there is shown generally at 30 a fuel cell embodying our invention which comprises cathode 10 from FIG. 1 of the drawing and an anode 31, separated by an annular electrolyte gasket 32. Electrolyte inlet conduit 33 and electrolyte outlet conduit 34 are sealingly related to the electrolyte gasket to circulate a free aqueous electrolyte to and from electrolyte chamber 35 formed by the anode, cathode and gasket. An anode gasket 36 and a cathode gasket 37 are positioned adjacent opposite faces of the electrolyte gasket to seal therewith and to hold the anode and cathode in assembled relation. Identical end plates 38 and 39 are associated with the anode and cathode gaskets, respectively, in sealing relation therewith. To hold the gaskets and end plates in assembled relation a plurality of tie bolts 40 are provided, each having a threaded end 41 and a nut 42 mounted thereon. To insure against any possibility of internal short circuiting of the fuel cell electrodes, the tie bolts are provided with insulative bushings 43 within each end plate and with an insulative washer 44 adjacent each terminus.

An oxidant chamber 45 is formed by the cathode gasket, cathode, and end plate 39. An oxidant inlet conduit 46 is sealingly associated with the end plate to allow oxidant to be fed to the oxidant chamber while an oxidant outlet conduit 47 is similarly associated with the end plate to allow the purge of oxidant. Where the fuel cell is to be operated on ambient air, no end plate 39 is required. The anode, anode gasket, and end plate 38 similarly cooperate to form a fuel chamber 48. A fuel outlet conduit 49, similar to oxidant outlet conduit 47, is provided. A fuel inlet conduit 50 is shown for providing a fuel to the fuel chamber. An electrical lead 51 is provided for anode 31. Such a fuel cell operates generally on a gaseous fuel.

With the type of cell shown in FIG. 3, the preferred electrolyte is an aqueous alkaline electrolyte. As is well understood in the art, the electrolyte may be aqueous alkali solution of any desired concentration. While the alkali metal hydroxides are the most commonly employed and of the lowest cost, it is appreciated that other soluble hydroxides may be employed, such as tetrasubstituted ammonium or phosphonium hydroxides.

It will of course be appreciated that a cathode electrode of our invention may be employed in an electrochemical cell utilizing a dissolved fuel and an alkaline electrolyte. In such a cell alcohol is preferred as the fuel. As used herein the term "alcohol" includes methanol, ethanol, n-propanol, isopropanol—that is, any alcohol having from 1 to 3 carbon atoms. Methanol is a preferred alcohol on the basis of cost and reactivity. Since the alcohols are miscible with water in all proportions, any desired quantity may be utilized. It is preferred, however, that the relation of hydroxyl ions to alcohol be maintained in a molar ratio that insures that all the alcohol will be consumed during extended operation of the unit. Other fuels are also suitable such as alkali metal formate, ammonia, ethylene glycol, etc.

In FIG. 3, anode electrode 31 is schematically illustrated. It may be of any conventional construction or configuration. Platinum anodes are suitable for employment in such a cell 30. Anodes capable of efficiently oxidizing alcohol usually include platinum metals or alloys as the electrocatalysts. Alloys of platinum and ruthenium are generally considered most efficient. The electrocatalyst may be employed as a high area coating on a substrate, suitably bonded into a porous mass or supported on a porous substrate of carbon, nickel, etc.

An illustrative operation of cell 30 in FIG. 3 comprises the employment of the above electrode 10 as the cathode in a fuel cell with a platinum electrode as the anode. The cell was operated with oxygen gas supplied to the cathode and hydrogen fuel supplied to the anode. A 54 weight percent potassium hydroxide solution was used as the electrolyte and the cell was operated at a temperature of 120° C. This cell operated quite satisfactorily and its operation will be discussed further below in the examples.

Examples of high surface area catalysts, supported catalysts, and electrodes made in accordance with our invention are set forth below:

EXAMPLE 1

A supported catalyst was prepared in accordance with our invention by the thermal decomposition of silver acetate and nickel acetate on graphite powder. 0.942 gram of silver acetate and 2.580 grams of nickel acetate were dissolved at a temperature of 85° C. in 15 milliliters of 50 volume percent pyridine-water. The solution was cooled to room temperature without precipitating the mixed metallic salts. Graphite powder in the amount of 5.47 grams was added to the solution which was then stirred to obtain a creamy paste. The pyridine-water solvents were evaporated from the mixture by heating the mixture on a hot plate with a surface temperature of 150° C. while the mixture was agitated constantly. The resulting dried powder was ground and then transferred to a 5.5 inch diameter petri dish. The dried powder was then heated further on a hot plate which had a surface temperature of 200° C. for one hour. The temperature was then raised to 250° C. and the heating continued for an hour. The heating was continued at 300° C. for two hours, which was then followed by heating at 330° C. for one hour. The resulting material was ground and sieved through a 325 mesh screen. The above heating process decomposed thermally the mixture of the metallic salts on the graphite powder thereby producing a supported catalyst.

EXAMPLE 2

The supported catalyst from Example 1 was then made into a PTFE-bonded fuel cell electrode by the method described in U.S. Pat. 3,297,484, issued Jan. 10, 1967, which is incorporated herein by reference. The resulting electrode contained 3 milligrams of nickel and 3 milligrams of silver per square centimeter.

EXAMPLE 3

Two electrochemical cells were each assembled as shown in FIG. 3 of the drawing. The first cell employed a graphite cathode made as in Examples 1 and 2 but without the metallic salts, and an anode made of platinum. The electrolyte in the cell was 54 weight percent potassium hydroxide and the cell was operated at a temperature of 120° C. Oxygen was supplied to the cathode as the oxidant. Hydrogen was supplied to the anode.

The second cell was substantially identical to cell No. 1 except that the cathode from Example 2 was used. The initial performance of these two cells, which are designated cells 1 and 2, respectively, is set forth below in Table I. In this table, there is shown the voltage in volts and the current density in milliamperes per square centimeter. The voltage is defined as the cathode voltage versus a standard hydrogen electrode voltage with resistive loss included.

TABLE I

| Cell 1 | | Cell 2 | |
|---|---|---|---|
| Volts | Current density, ma./cm.² | Volts | Current density, ma./cm.² |
| 0.990 | 0 | 1.090 | 0 |
| 0.945 | 5 | 1.045 | 5 |
| 0.925 | 10 | 1.030 | 10 |
| 0.905 | 20 | 1.005 | 20 |
| 0.860 | 60 | 0.960 | 60 |
| 0.830 | 100 | 0.930 | 100 |
| 0.770 | 200 | 0.870 | 200 |
| 0.745 | 240 | 0.855 | 240 |
| 0.705 | 320 | 0.815 | 320 |

As it is seen from the table, the supported catalyst of our invention performs substantially better than the porous carbon when these materials are used for the cathode electrode in the above type of cell.

EXAMPLE 4

An unsupported, high surface area catalyst was prepared by the thermal decomposition of silver acetate and nickel acetate in accordance with our invention. 9.145 grams of silver acetate and 13.634 grams of nickel acetate were dissolved at a temperature of 85° C. in 16 milliliters of 50 volume percent pyridine-water. The solvents were evaporated by heating the solution on a hot plate which had a surface temperature of 150° C. The dried material was transferred to a 5.5 inch diameter petri dish and reheated on a hot plate which had a surface temperature of 150° C. for 1¼ hours. The material was ground and sieved through a 325 mesh screen. The material was then heated again on a hot plate with a surface temperature of 250° C. for 1½ hours. The temperature of the hot plate was then increased to 250° C. until the powder ignited. The temperature was then increased to 350° C. and the material was heated at this temperature for one hour. Subsequently, the powder was sieved through a 325 mesh screen. The above heating process decomposed thermally the mixture of the metallic salts to result in an unsupported high surface area catalyst.

EXAMPLE 5

The unsupported high surface area catalyst material of Example 3 was then made into a PTFE-bonded fuel cell electrode by the above-identified method of U.S. Pat. 3,297,484. The electrode contained 37 milligrams of silver and 20 milligrams of nickel per square centimeter.

EXAMPLE 6

The second electrochemical cell which is described above in Example 3 was again employed and operated in the same manner except that the cathode was the cathode from Example 5 which employed the unsupported catalyst bonded together by PTFE into an electrode structure. The performance of this cell, which is identified as cell 3, is set forth below in Table II. This performance was measured in the same manner as the performance of cells 1 and 2.

TABLE II

| Cell 3 volts: | Cell 3 current density ma./cm.² |
|---|---|
| 1.085 | 0 |
| 1.060 | 5 |
| 1.040 | 10 |
| 1.020 | 20 |
| 0.980 | 60 |
| 0.950 | 100 |
| 0.895 | 200 |
| 0.850 | 240 |
| 0.810 | 320 |

EXAMPLE 7

In this example, an electrochemical cell, which is designated cell No. 4, was assembled as shown in FIG. 3 of the drawing. This cell had a platinum black cathode, a 27 weight percent potassium hydroxide electrolyte, 85 weight percent hydrazine hydrate solution as the fuel, and an operating temperature of 25° C. The electrode from Example 5 was made the anode in this cell. Oxygen was supplied to the cathode as the oxidant. In Table III below, there is shown for this cell the voltage in volts and the current density in milliampers per square centimeter. The voltage set forth in Table III is that between the anode and a hydrogen reference electrode in the same electrolyte with resistive loss included.

TABLE III

| Cell 4 volts: | Cell 4 current density ma./cm.² |
|---|---|
| −0.110 | 0 |
| −0.100 | 5 |
| −0.098 | 10 |
| −0.088 | 20 |
| −0.056 | 60 |
| −0.033 | 100 |
| −0.015 | 120 |

EXAMPLE 8

An unsupported high surface area catalyst was prepared in accordance with our invention by the thermal decomposition of silver acetate and nickel acetate. 3.80 grams of silver acetate and 10.41 grams of nickel acetate were mixed together and transferred to a 5.5 inch diameter petri dish. The mixed salts were heated on a hot plate with a surface temperature of 150° C. for a period of one hour. The mixed salts were then ground and sieved through a 325 mesh screen. The heating was then continued on the hot plate which had a surface temperature of 200° C. for 40 minutes. The material was heated further on the same hot plate with a surface temperature of 250° C. until the powder ignited. The hot plate temperature was then increased to 350° C. for 1½ hours. The powder material was then sieved through a 325 mesh screen. The above heating process decomposed thermally the mixture of the metallic salts to result in an unsupported high surface area catalyst.

EXAMPLE 9

An unsupported high surface area catalyst was prepared in accordance with our invention by the thermal decomposition of silver carbonate and nickel carbonate. 2.70 grams of silver carbonate and 4.80 grams of nickel carbonate were mixed together, ground, sieved through a 325 mesh screen and transferred to a 5.5 inch diameter petri dish. The mixed salts were then heated on a hot plate with a surface temperature of 150° C. for ½ hour. The heating was continued on the hot plate which had a surface temperature of 200° C. for ½ hour. The material was heated further on the same hot plate with a surface temperature of 250° C. for one hour and then at a surface temperature of 300° C. for 1½ hours. The hot plate temperature was then increased to 350° C. for one hour. The powder was then placed in a muffle furnace and heated at a temperature of 500° C. for ¾ hour. The above powder was then sieved through a 325 mesh screen. The above heating process decomposed thermally the mixture of the metallic salts to result in an unsupported high surface area catalyst.

EXAMPLE 10

An unsupported high surface area catalyst was prepared in accordance with our invention by the thermal decomposition of silver acetate and nickel formate. 3.80 grams of silver acetate and 7.73 grams of nickel formate were mixed together and transferred to a 5.5 inch diameter petri dish. The mixed salts were heated on a hot plate with a surface temperature of 150° C. for a period of one hour. The mixed salts were then ground and sieved through a 325 mesh screen. The heating was then continued on the hot plate which had a surface temperature of 200° C. for 40 minutes. The material was heated further on the same hot plate with a surface temperature of 250° C. until the powder ignited. The hot plate temperature was then increased to 350° C. for 1½ hours. The powder material was then sieved through a 325 mesh screen. The above heating process decomposed thermally the mixture of the metallic salts to result in an unsupported high surface area catalyst.

EXAMPLE 11

An unsupported high surface area catalyst was prepared in accordance with our invention by the thermal decomposition of silver carbonate and nickel acetate. 3.05 grams of silver carbonate and 10.12 grams of nickel acetate were mixed together, and transferred to a 5.5 inch diameter petri dish. The mixed salts were then heated on a hot plate with a surface temperature of 150° C. for ½ hour. The salts were ground and sieved through a 325 mesh screen. The heating was then continued on the hot plate which had a surface temperature of 200° C. for ½ hour. The material was heated further on the same hot plate with a surface temperature of 250° C. for one hour and at a surface temperature of 300° C. until the powder ignited. The hot plate temperature was then increased to 350° C. for two hours. The powder was then placed in a muffle furnace and heated at a temperature of 500° C. for one hour. The above powder was then sieved through a 325 mesh screen. The above heating process decomposed thermally the mixture of the metallic salts to result in an unsupported high surface area catalyst.

EXAMPLE 12

An unsupported high surface area catalyst was prepared in accordance with our invention by the thermal decomposition of silver acetate and nickel carbonate. 3.68 grams of silver acetate and 5.41 grams of nickel carbonate were mixed together, and transferred to a 5.5 inch diameter petri dish. The mixed salts were then heated on a hot plate with a surface temperature of 150° C. for ½ hour. The salts were ground and sieved through a 325 mesh screen. The heating was then continued on the hot plate which had a surface temperature of 200° C. for one hour. The material was heated further on the same hot plate with a surface temperature of 250° C. until the powder ignited. The hot plate temperature was then increased to 300° C. for ½ hour and to 350° C. for two hours. The powder was then placed in a muffle furnace and heated at a temperature of 500° C. for one hour. The above powder was then sieved through a 325 mesh screen. The above heating process decomposed thermally the mixture of the metallic salts to result in an unsupported high surface area catalyst.

While other modifications of the invention and variations thereof which may be employed within the scope of this invention have not been described, the invention is intended to include such as may be embraced within the following claims.

What we claim as new and desire to secure by Letters Patent of the United States is:

1. A method of forming an electrode with a high surface area catalyst material consisting of forming a solution from a mixture of silver acetate, nickel acetate, and a solvent of pyridine and water, evaporating the solvent from the solution, decomposing thermally the mixture of the metallic acetates to form a silver metal and nickel metal catalyst material, and forming the catalyst material into an electrode.

2. A method of forming an electrode in accordance with claim 1, wherein the solution is applied to at least a portion of a porous substrate prior to the evaporation of the solvent therefrom.

3. A method of forming an electrode in accordance with claim 1, wherein the solution is applied to finely divided powder prior to the evaporation of the solvent therefrom.

References Cited

UNITED STATES PATENTS

| | | | |
|---|---|---|---|
| 2,040,782 | 5/1936 | Peski | 252—474 |
| 2,615,932 | 10/1952 | Marko et al. | 136—120 |
| 3,291,753 | 12/1966 | Thompson | 136—120 |
| 3,318,730 | 5/1967 | Kreiselmaier | 136—86 X |
| 3,392,059 | 7/1968 | May | 136—120 X |

WINSTON A. DOUGLAS, Primary Examiner

M. J. ANDREWS, Assistant Examiner